United States Patent Office 3,637,560
Patented Jan. 25, 1972

3,637,560
PREPARATION OF AQUEOUS METHYL-
SILSESQUIOXANE DISPERSIONS
Joseph Cekada, Jr., Midland, Mich., assignor to Dow-
Corning Corporation, Midland, Mich.
No Drawing. Filed Mar. 13, 1967, Ser. No. 622,417
Int. Cl. C08g 31/12, 51/24
U.S. Cl. 260—29.2 M
6 Claims

ABSTRACT OF THE DISCLOSURE

Stable aqueous dispersions of methylsilsesquioxane are prepared by contacting an alkali or alkaline earth metal monomethylsiliconate with an acid cation exchange resin and employing an anionic or cationic surfactant. The dispersion may subsequently be neutralized. These dispersions are useful for imparting dulling, antislip, and antisoiling characteristics to fabrics.

This invention relates to processes for the preparation of stable aqueous dispersions of methylsilsesquioxane.

More specifically, this invention relates to a process for preparing a stable aqueous dispersion of methylsilsesquioxane which comprises (1) contacting an aqueous solution of an alkali or alkaline earth metal monomethylsiliconate with an acid cation exchange resin, (2) removing the exchanged material from contact with the exchange resin, and (3) adding an anionic or cationic surfactant to the resulting aqueous dispersion of the methylsilsesquioxane.

This invention further relates to a process for preparing a stable aqueous dispersion of methylsilsesquioxane which comprises (1) slowly adding an aqueous solution of an alkali or alkaline earth metal monomethylsiliconate, with agitation, to an aqueous slurry of an acid cation exchange resin and an anionic surfactant, and (2) separating the aqueous dispersion of the methylsilsesquioxane from the exchange resin.

The aqueous dispersion of the exchanged siliconate must be acidic or basic for at least a short period of time after the exchange has taken place in order that the desired polymerization be achieved to form the methylsilsesquioxane.

The aqueous methylsilsesquioxane dispersions prepared in accordance with this invention are useful for imparting dulling, antislip and antisoiling characteristics to fabrics as described in Canadian Pat. 746,860. The preparation of methylsilsesquioxane dispersions from alkoxy silanes as described in the aforementioned Canadian patent is an excellent technique. However, the resulting dispersions are sensitive to the alcohols inherently produced by the process and are also sensitive to cations, such as sodium and calcium cations, which may be present in the system. It has now been discovered that these problems can be avoided and stable aqueous dispersions of methylsilsesquioxane can be prepared when the above defined processes of this invention are employed because they do not produce an alcohol and the ions are removed by the exchange resin.

While any of the known water soluble alkali or alkaline earth metal monomethylsiliconates can be employed in the processes of this invention, the potassium and sodium salts are preferred, especially the latter since it is a commercially available material.

In a like manner, any of the known cation exchange resins can be employed herein. It is essential that the cation exchange resin be acidic for use in these processes. One can use those cation exchange resins which are sold in the acid form, or they can convert a non-acidic (i.e., the salt form) cation exchange resin to the acid form by simply treating it with an acid. Of the various types of cation exchange resins commercially available, the sulfonic acid type is preferred. The amount of exchange resin employed must, of course, be sufficient to remove all the cations from the siliconate.

Contact between the siliconate and the exchange resin can be accomplished in many ways as will be obvious to those skilled in the art. For example, the aqueous siliconate solution can be passed over the acid cation exchange resin in a typical ion exchange column. Usually, the column technique can only be employed for preparing dispersions having a low methylsilsesquioxane content, that is, less than about 5% solids.

Another means of effecting the contact of the siliconate and the exchange resin is by slowly adding, with agitation, the aqueous siliconate solution to an aqueous slurry of an acid cation exchange resin. This process is particularly suitable for use with commercial or crude siliconates and for preparing dispersions having a high methylsilsesquioxane content, that is, up to about 15% solids.

A third means of effecting the contact of the siliconate and the exchange resin involves the preparation of an aqueous solution of the siliconate and an anionic surfactant and then contacting this solution with the exchange resin, for example, by passing it through a column of the resin.

The anionic and cationic surfactants that can be employed in the processes of this invention are well known. Of the available anionic surfactants, the alkylbenzene sulfonic acids or the salts thereof containing 6 to 18 carbon atoms in the alkyl group are preferred. Of the available cationic surfactants, the quaternary ammonium hydroxides and halides are preferred. Generally speaking, ammonium hydroxide is used as a catalyst for the polymerization along with the cationic surfactants. When an exchange column is used, an anionic surfactant can either be added to the aqueous siliconate solution before it enters the column or it can be added to the aqueous methylsilsesquioxane dispersion after it leaves the column. In the case of the cationic surfactant, it must be added to the aqueous methylsilsesquioxane dispersion after it leaves the column. When a slurry of the exchange resin is used and the siliconate solution added to this slurry, one can either add an anionic or cationic surfactant to the methylsilsesquioxane dispersion after its separation from the exchange resin or an anionic surfactant can be added to the slurry of the exchange resin prior to the addition of the siliconate. In no instance can the cationic surfactant be in contact with the resin because it will react therewith as would be obvious to those skilled in the art. Once the silsesquioxane dispersion has been prepared it can be neutralized with any suitable organic or inorganic acids or bases. Triethanolamine and ammonium hydroxide are the preferred bases and acetic acid and hydrochloric acid are the preferred acids.

Now in order that those skilled in the art may better understand how the present invention can be practiced, the following examples are given by way of illustration and not by way of limitation. All parts and percents referred to herein are on a weight basis unless otherwise specified.

EXAMPLE 1

10 g. of a commercial aqueous sodium monomethylsiliconate solution containing the equivalent of 21.2% methylsilsesquioxane solids was diluted with 33.5 g. of water and then passed through a column of the acid form of a commercial cation exchange resin. About 10 g. of clear acidic effluent was collected at the bottom of the column. One drop of dodecylbenzene sulfonic acid was added to the effluent. The product was a stable aqueous dispersion containing less than 3% methylsilsesquioxane solids.

EXAMPLE 2

To a 500 ml. flask equipped with stirrer and addition funnel there was added 257 ml. (wet volume) of the acid form of a commercial cation exchange resin. All surface water was decanted from the resin and then 1 g. of dodecylbenzene sulfonic acid added. From the funnel there was added to the resin, with agitation, 100 ml. of a diluted commercial aqueous sodium monomethylsiliconate solution containing the equivalent of 10% methylsilsesquioxane solids over a period of 90 minutes. The aqueous dispersion of the methylsilsesquioxane was separated from the resin by filtration and contained about 4.1% silsesquioxane solids.

EXAMPLE 3

To a 500 ml. flask equipped with stirrer and addition funnel there was added 229 ml. (wet volume) of the acid form of a commercial cation exchange resin, 87 g. of water and 4.5 g. of dodecylbenzene sulfonic acid. From the funnel there was added to the resin, with agitation, 77 ml. of a commercial aqueous sodium monomethylsiliconate solution containing the equivalent of 22.8% methylsilsesquioxane solids over a period of one hour. Agitation was continued overnight and then the aqueous dispersion of the methylsilsesquioxane was separated from the resin by filtration. It contained about 8.9% silsesquioxane solids. The dispersion was easily neutralized with ammonium hydroxide.

The neutralized dispersion was tested and found effective as an antisoilant for cotton.

EXAMPLE 4

Into a flask fitted with a stirrer there was placed 1000 ml. (about 850 g. dry weight) of a wet commercial sulfonated polystyrene cation exchange resin. The resin was activated with dilute sulfuric acid and then repeatedly washed with distilled water until the wash water was neutral. To this activated resin slurry there was added 8.9 g. of dodecylbenzene sulfonic acid and 500 g. of distilled water. 392 g. of a commercial sodium monomethylsiliconate containing the equivalent of 22.8% methylsilsesquioxane solids was diluted with 642.5 g. of distilled water and then added, with agitation, over a period of about 90 minutes to the above prepared resin slurry. At the end of the addition the acidic aqueous methylsilsesquioxane dispersion was decanted from the resin, allowed to stand for about 5 hours, and then was neutralized with concentrated ammonium hydroxide. About 1790 g. of the aqueous dispersion containing about 5% methylsilsesquioxane solids was obtained.

EXAMPLE 5

A 100 ml. burette having about a ½ inch diameter was filled with a wet commercial sulfonic acid polystyrene cation exchange resin to a height of about 13 inches. The water level was adjusted to about ½ inch above the resin. An aqueous solution containing 100 g. of sodium monomethylsiliconate that was essentially free of sodium chloride was slowly added to the top of the exchange column at such a rate that the ½ inch water level above the resin was maintained. The addition of the siliconate was completed in about 30 minutes. To the slightly hazy methylsilsesquioxane dispersion that was obtained, 2.9 g. of dodecylbenzene sulfonic acid was immediately added. This dispersion contained about 2.8% methylsilsesquioxane solids. The dispersion was placed in a capped bottle on a rotary wheel. After 12 days on the wheel, still no significant change in the dispersion was noted.

EXAMPLE 6

1.4 g. of dodecylbenzene sulfonic acid in the form of a 5.32% aqueous solution was slowly added to 50 g. of an agitated aqueous sodium monomethylsiliconate solution containing the equivalent of about 3% monomethylsilsesquioxane. This solution was then passed through an ion exchange column, made by placing 60 mls. of a wet commercial sulfonic acid polystyrene exchange resin in a 100 ml. burette and adjusting the water level to ½ inch above the resin, over a period of 15 minutes. A clear aqueous dispersion of the methylsilsesquioxane, containing a slight amount of fine precipitate, was obtained.

EXAMPLE 7

When aqueous solutions of potassium, lithium, calcium or barium monomethylsiliconates are substituted for the sodium monomethylsiliconate of the previous examples, similar results are obtained.

EXAMPLE 8

When the surfactants specified below are substituted for the dodecylbenzene sulfonic acid of the previous examples, similar results are obtained.

Sodium dodecylbenzene sulfonate
Octylbenzene sulfonic acid
Octadecyl sulfonic acid
Nonylnaphthalene sulfonic acid
Lauryl hydrogen sulfate
Tridecyl hydrogen sulfate

EXAMPLE 9

When sodium hydroxide, sodium bicarbonate or triethanolamine is used to neutralize the dispersions of the previous examples instead of ammonium hydroxide, similar results are obtained.

EXAMPLE 10

A small ion exchange column was prepared as in Example 6. 100 g. of an aqueous sodium monomethylsiliconate, containing the equivalent of about 3% methylsilsesquioxane, was added to the column at a rate which maintained the ½ inch water level. A 25 ml. sample of the exchanged material was caught in a solution consisting of 23.25 g. of water, 0.75 g. of a 5% solution of lauryltrimethyl ammonium chloride and 0.425 g. of a 1% ammonium hydroxide solution, while stirring on a magnetic stirrer. The addition of the 25 ml. sample took place over a period of 6 minutes. A hazy blue aqueous dispersion of the methylsilsesquioxane was obtained. The sample was then placed on a rotary wheel for 24 hours. There was no apparent change after this time.

EXAMPLE 11

When the surfactants specified below are substituted for the lauryltrimethyl ammonium chloride of Example 10, similar results are obtained.

Cocotrimethyl ammonium chloride
Cetylbenzyldimethyl ammonium chloride
Laurylbenzyldimethyl ammonium chloride
Stearyldimethylbenzyl ammonium chloride That which is claimed is:

1. A process for preparing a stable aqueous dispersion of methylsilsesquioxane which comprises (1) slowly adding an aqueous solution of an alkali or alkaline earth metal monomethylsiliconate, with agitation, to an aqueous slurry of an acid cation exchange resin and an anionic surfactant, and (2) separating the aqueous dispersion of the methylsilsesquioxane from the exchange resin.

2. The process of claim 1 wherein the methylsilsesquioxane dispersion is subsequently neutralized.

3. The process of claim 1 wherein the siliconate is an alkali metal siliconate and the exchange resin is a sulfonic acid exchange resin.

4. The process of claim 3 wherein the siliconate is sodium monomethylsiliconate, the exchange resin is a sulfonic acid polystyrene exchange resin, and the surfactant is dodecylbenzene sulfonic acid.

5. A process for preparing a stable aqueous dispersion of methylsilsesquioxane which comprises (1) contacting an aqueous solution of an alkali or alkaline earth metal monomethylsiliconate and an anionic surfactant with an acid cation exchange resin, and (2) thereafter removing the exchanged material and surfactant from contact with the exchange resin.

6. The process of claim 5 wherein the siliconate is sodium monomethylsiliconate, the surfactant is dodecylbenzene sulfonic acid, the exchange resin is a sulfonic acid polystyrene exchange resin, and the contact is carried out by the column technique.

References Cited
UNITED STATES PATENTS

| | | | |
|---|---|---|---|
| 2,891,920 | 6/1959 | Hyde et al. | 260—29.2 M |
| 3,046,242 | 7/1962 | Santelli | 260—29.2 M |
| 3,294,725 | 12/1966 | Findlay et al. | 260—29.2 M |
| 3,360,491 | 12/1967 | Axon | 260—29.2 M |
| 3,433,780 | 3/1969 | Cekaoa et al. | 260—29.2 M |

JOHN C. BLEUTGE, Primary Examiner

U.S. Cl. X.R.

260—46.5 R